United States Patent [19]

Burgie et al.

[11] Patent Number: 5,422,088
[45] Date of Patent: Jun. 6, 1995

[54] PROCESS FOR HYDROGENATION OF TETRACHLOROSILANE

[75] Inventors: Richard A. Burgie, Midland; Patrick J. Harder, Bay City; David H. Sawyer, Midland, all of Mich.

[73] Assignee: Hemlock Semiconductor Corporation, Hemlock, Mich.

[21] Appl. No.: 188,852

[22] Filed: Jan. 28, 1994

[51] Int. Cl.$^6$ ............................................. C01B 33/107
[52] U.S. Cl. ................................... 423/342; 423/347
[58] Field of Search ............................. 423/342, 347

[56] References Cited

U.S. PATENT DOCUMENTS

| | | | |
|---|---|---|---|
| 2,821,369 | 1/1958 | Hillard | 257/241 |
| 3,250,322 | 5/1966 | McCrary et al. | 165/133 |
| 3,391,016 | 7/1968 | McCrary et al. | 117/93.3 |
| 3,933,985 | 1/1976 | Rogers | 423/342 |
| 4,217,334 | 8/1980 | Weigert et al. | 423/342 |
| 4,836,997 | 6/1989 | Lepage et al. | 423/342 |
| 5,126,112 | 6/1992 | Burgie | 423/349 |

FOREIGN PATENT DOCUMENTS 02-172811  7/1990  Japan ................................ 423/342

Primary Examiner—Gary P. Straub
Assistant Examiner—Stuart L. Hendrickson
Attorney, Agent, or Firm—William F. Boley

[57] ABSTRACT

An improved process for contacting hydrogen gas and tetrachlorosilane in a reactor comprising a pressurizable shell having located therein a reaction vessel forming a substantially closed inner chamber for reacting the hydrogen gas with the tetrachlorosilane. The improvement comprises feeding to an outer chamber between the pressurizable shell and the reaction vessel a gas or gaseous mixture having a chlorine to silicon molar ratio greater than about 3.5. The improvement reduces the concentration of hydrogen and tetrachlorosilane in the outer chamber that results from leakage of these gases from the substantially closed inner chamber and the detrimental reactions associated with such leakage on structural elements and performance of the reactor.

7 Claims, 1 Drawing Sheet

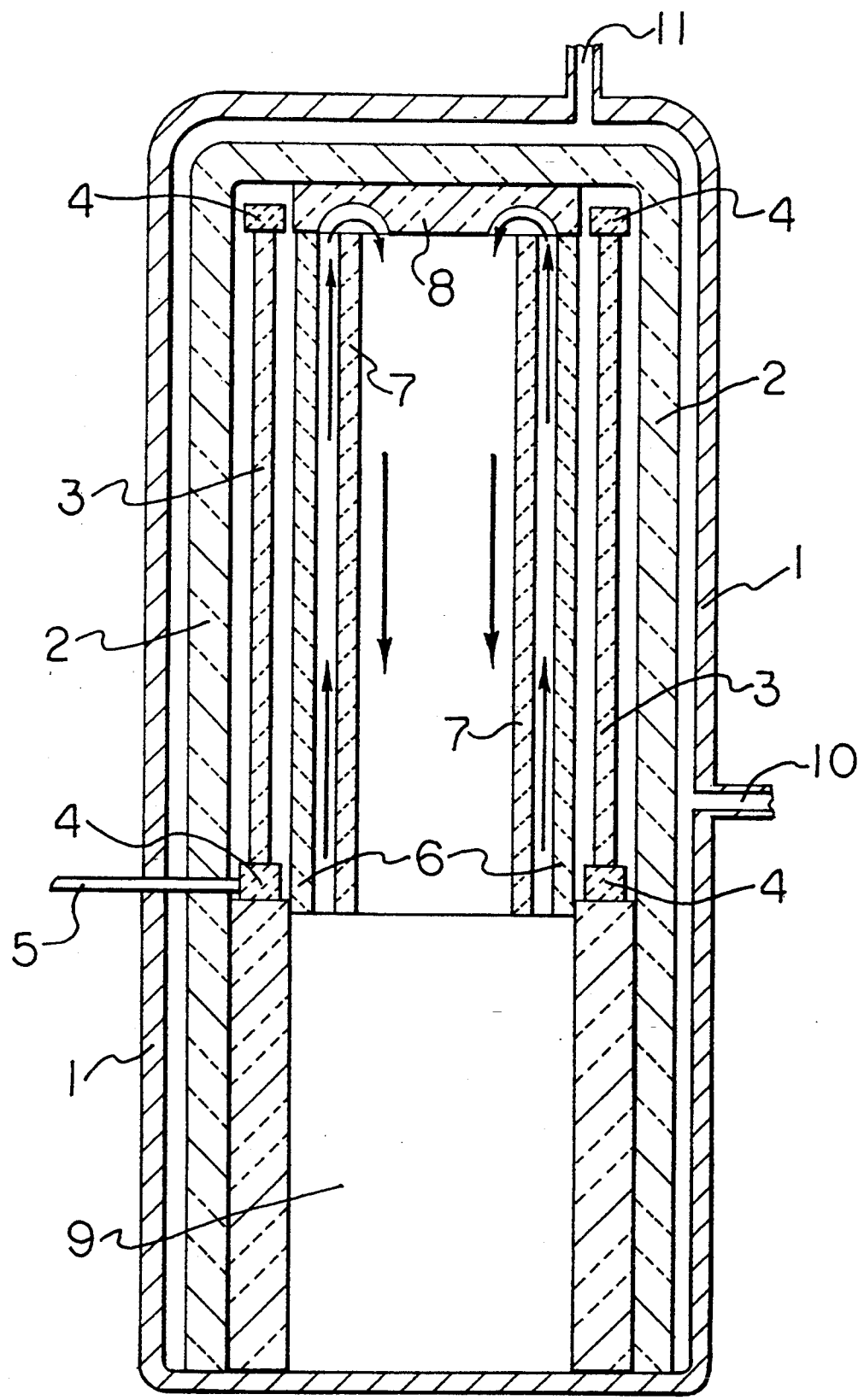

PROCESS FOR HYDROGENATION OF TETRACHLOROSILANE

BACKGROUND OF INVENTION

The present invention is an improved process for contacting hydrogen gas and tetrachlorosilane in a reactor comprising a pressurizable shell having located therein a reaction vessel forming a substantially closed inner chamber for reacting the hydrogen gas with the tetrachlorosilane. The improvement comprises feeding to an outer chamber between the pressurizable shell and the reaction vessel a gas or gaseous mixture having a chlorine to silicon molar ratio greater than about 3.5. The improvement reduces the concentration of hydrogen and tetrachlorosilane in the outer chamber that results from leakage of these gases from the substantially closed inner chamber and the detrimental reactions associated with such leakage on structural elements and performance of the reactor.

In a typical process for producing hyperpure semiconductor-grade silicon, trichlorosilane gas is reduced in the presence of hydrogen and deposited onto a heated element. A significant portion of the trichlorosilane gas fed to such a process is de-hydrogenated to form by-product tetrachlorosilane. It is desirable to convert this by-product tetrachlorosilane back into trichlorosilane which can be recycled to the deposition process.

Rogers, U.S. Pat. No. 3,933,985, issued Jan. 20, 1976, describes a process for converting tetrachlorosilane to trichlorosilane. The process involves passing hydrogen and tetrachlorosilane vapors through a reaction chamber held at a temperature of between 900° C. and 1200° C.

Weigert et al., U.S. Pat. No. 4,217,334 issued Aug. 12, 1980, describe an improved process for converting tetrachlorosilane to trichlorosilane. The process involves reacting tetrachlorosilane with hydrogen at a temperature of 600° C. to 1200° C., the tetrachlorosilane and hydrogen mixture having a molar composition between 1:1 and 1:50 in equilibrium with trichlorosilane and hydrogen chloride, and quickly quenching the reacted mixture to below 300° C. The process used by Weigert et al. was conducted in what is described as a gas-tight tube constructed from carbon.

Reactors for the hydrogenation of tetrachlorosilane by hydrogen gas must be able to withstand high temperatures and the corrosive nature of materials such as chlorosilanes and hydrogen chloride gas formed during the hydrogenation process. Therefore, carbon based materials, including carbon, graphite, carbon fiber composites and the like are typically used inside the reactor. The carbon based materials can be used, for example, as heat insulating materials, as heating elements, and to form a vessel within the reactor in which to react the hydrogen gas and tetrachlorosilane.

In such reactors it is typically not possible to entirely confine the feed hydrogen gas and tetrachlorosilane to the reaction chamber. These gases leak through seals and joints in the reactor into surrounding spaces containing insulation materials and other structural elements. When hydrogen gas contacts these structural elements a number of detrimental reactions are possible depending on the composition of the structural element and the temperature at the contact location. For example, at temperatures of about 400° C. to 1000° C., hydrogen can react with carbon to form methane. This reaction can reduce carbon based materials such as electrodes, bridges, and insulation into a fine powder. The methanization reaction can also be a major source of carbon contamination in the trichlorosilane product. A second reaction which can take place in the reactor at temperatures above about 800° C. in the presence of hydrogen and chlorosilanes is the conversion of carbon based materials into silicon carbide with the liberation of hydrogen chloride. This reaction can degrade the physical integrity of the carbon based-elements. The liberated hydrogen chloride can inhibit the production of trichlorosilane. A third reaction is the deposition of silicon on high-temperature elements within the reactor. In an atmosphere comprising hydrogen gas and tetrachlorosilane where the concentration of hydrogen gas is greater than about 85 mole percent, the tetrachlorosilane can be reduced to elemental silicon and deposited on high-temperature parts of the reactor. A buildup of silicon in the reactor can inhibit heat transfer within the reactor as well as make elements of the reactor brittle and difficult to disassemble. Also hydrogen gas has a high thermal conductivity and its presence in the space between the reaction vessel and the reactor shell can cause increased heat loss from the reactor and increased shell temperature in comparison to gases with lower thermoconductivity.

The present inventors have found that the detrimental actions associated with the present of hydrogen gas in contact with elements of the reactor outside the intended reaction zone can be reduced by feeding to the area of the reactor outside the reaction zone a gas or gaseous mixture having a chlorine to silicon molar ratio greater than about 3.5. A preferred feed gas is selected from a group consisting of tetrachlorosilane and hydrogen chloride.

BRIEF DESCRIPTION OF DRAWINGS

FIG. 1 is a cutaway lateral view of an embodiment of a reactor useful for the practice of the present invention.

SUMMARY OF INVENTION

The present invention is an improved process for contacting hydrogen gas and tetrachlorosilane in a reactor comprising a pressurizable shell having located therein a reaction vessel forming a substantially closed inner chamber for reacting the hydrogen gas with the tetrachlorosilane. The improvement comprises feeding to an outer chamber between the pressurizable shell and the reaction vessel a gas or gaseous mixture having a chlorine to silicon molar ratio greater than about 3.5. The improvement reduces the concentration of hydrogen and tetrachlorosilane in the outer chamber that results from leakage of these gases from the substantially closed inner chamber and the detrimental reactions associated with such leakage on structural elements and performance of the reactor.

DESCRIPTION OF INVENTION

The present invention is an improved process for hydrogenation of tetrachlorosilane, where the process comprises contacting hydrogen gas and tetrachlorosilane at a temperature greater than about 600° C. in a reactor comprising a pressurizable shell having located therein a reaction vessel forming a substantially closed inner chamber for reacting the hydrogen gas with the tetrachlorosilane, and an outer chamber between the pressurizable shell and the reaction vessel, the outer chamber having located therein and adjacent to the shell a carbon or graphite insulation layer and between the insulation layer and the reaction vessel one or more heating elements. The improvement comprises feeding to the outer chamber a gas or gaseous mixture having a chlorine to silicon molar ratio greater than about 3.5.

As previously discussed, the hydrogenation of tetrachlorosilane at temperatures above about 600° C. is known as are reactors for conducting the process. Generally, it is preferred that the process be run at temperatures within a range of about 800° C. to 1200° C. to increase operating efficiencies. The mole ratio of tetrachlorosilane to hydrogen gas fed to the reactor is not critical to the practice of the present improvement and can generally be those known in the art. For example, the mole ratio of tetrachlorosilane to hydrogen can be within a range of about 1:1 to 1:50. In addition it is known that carbon and graphite materials can be used as materials of construction for forming internal elements of such reactors.

FIG. 1 is a cutaway lateral view of a reactor useful for practice of the present invention. The reactor for reacting hydrogen and chlorosilanes comprises pressurizable shell 1 composed of a stainless steel, for example, Inconel®, Huntington Alloy Products Division, Huntington, W. Va. The inner surface of pressurizable shell 1 is thermally insulated from heating element 3 by thermal insulator 2. Thermal insulator 2 can be formed from standard high temperature insulating materials, for example, carbon or graphite felt and solid sheets. Preferred is when thermal insulator 2 is an insulating system similar to that described by Burgie, U.S. Pat. No. 5,126,112, issued Jun. 30, 1992, hereby incorporated by reference.

Heating element 3 can be formed from, for example, carbon, graphite, or a silicon carbide coated carbon composite. Preferred, is when heating element 3 is formed from a silicon carbide coated carbon composite. Heating element 3 can be of standard configuration, for example, one or more rods or slats positioned around the exterior of the reaction vessel. Heating element 3 is electrically connected to electrode 5, which provides a means for connecting to an external energy source.

Heating element 3 is electrically insulated from the remainder of the reactor by electrical insulators 4. Electrical insulators 4 can be formed from standard high temperature and chemically resistant electrical insulating material, for example, fused silica or silicon nitride. Preferred is when electrical insulators 4 are formed from silicon nitride, i.e. $Si_3N_4$.

Heating element 3 surrounds a reaction vessel. In FIG. 1, the reaction vessel is of a dual wall design having an outer zone and an inner zone formed by two concentrically positioned tubes. The outer zone is formed between tube 6 and tube 7. The inner zone is formed by tube 7. The top of the reaction vessel is formed by diverter 8.

Tube 6, tube 7, and diverter 8 can be formed from standard materials for construction of high temperature reactors, for example, carbon, graphite, silicon carbide coated carbon, and silicon carbide coated graphite; or from silicon carbide coated carbon fiber composites. Preferred is when tube 6, tube 7, and diverter 8 are formed from a silicon carbide coated carbon fiber composite.

The reactor can be connected to heat exchanger 9, where the hydrogen and chlorosilane fed to the reactor are preheated before passing into the outer zone formed between tube 6 and tube 7. These gases then flow through the outer zone of the reaction vessel where additional heating occurs from heating element 3 and are diverted by diverter 8 to reverse flow through the inner zone formed by tube 7. Heated gases exiting tube 7 then pass through heat exchanger 9, transferring heat to the incoming feed gases. Heat exchanger 9 can be of standard design. For example, heat exchanger 9 can be similar in design to those described by Hillard, U.S. Pat. No. 2,821,369, issued Jan. 28, 1958; McCrary et al., U.S. Pat. No. 3,250,322, issued May 10, 1966; and McCrary et al., U.S. Pat. No. 3,391,016, issued Jul. 2, 1968.

The improvement of the present invention comprises feeding to the outer chamber of a reactor a gas or gaseous mixture having a chlorine to silicon molar ratio greater than about 3.5. By way of example, in FIG. 1 a substantially closed inner chamber for reacting hydrogen gas with tetrachlorosilane is formed by tube 6, diverter 8, and heater exchanger 9. The outer chamber of the reactor is that area between the pressurizable shell and the substantially closed inner chamber. By "substantially closed" it is meant that the reaction vessel is designed to retain feed materials within an enclosed area for a sufficient time for such feed materials to be reacted. Those skilled in the art will recognize that typically such reaction vessels can not be made entirely gas tight, and some leakage of hydrogen and tetrachlorosilane gases into the area of the reactor exterior to the reaction vessel occurs. This leakage can occur, for example, at seals and joints of the reaction vessel due to differential thermal expansion and contraction of the materials of construction.

As explained in the Background Section herein, the leakage of hydrogen and tetrachlorosilane into the areas of the reactor exterior to the reaction vessel can have detrimental effects on elements located within the area of the reactor exterior to the reaction vessel. The present inventors have found that if this area of the reactor exterior to the reaction vessel is fed a gas or gaseous mixture having a chlorine to silicon molar ratio greater than about 3.5 these detrimental effects can be reduced. For example in FIG. 1, a gas or gaseous mixture having a chlorine to silicon molar ratio greater than about 3.5 can be provided to the reactor through inlet port 10 and if desired removed through outlet port 11. Alternatively, a gas or gaseous mixture as described could be fed though inlet port 10 to form a blanket within the area of the reactor exterior to the reaction vessel. The gas or gaseous mixture can be fed to the outer chamber of the reactor at a rate sufficient to create a positive pressure in the outer chamber, thus reducing leakage of gases from the reaction vessel into the outer chamber. Optimally, the pressure of the gas or gaseous mixture having a chlorine to silicon molar ratio greater than about 3.5 fed to the reactor need only be sufficient to prevent leakage of hydrogen and tetrachlorosilane into the area of the reactor exterior to the reaction vessel. Such pressure will be process dependent and can be determined by standard methods known to those skilled in the art.

The gas or gaseous mixture having a chlorine to silicon molar ratio greater than about 3.5 is fed to the reactor. The gas or gases forming the mixture are selected from a group consisting of chlorine, hydrogen chloride, silanes, and polysilanes. The gas can be, for example, chlorine, hydrogen chloride, and tetrachlorosilane; mixtures of such gases; and mixtures of such gases with trichlorosilane, dichlorosilane and chlorosilane, where the molar ratio of chlorine to silicon is greater than about 3.5. For example, a mixture of one mole of HSiCl₃ and 2 moles of SiCl₄ has a molar ratio of chlorine to silicon of 3.67. A preferred gas for practicing the present invention is selected from a group consisting of tetrachlorosilane and hydrogen chloride.

The following example is provided to illustrate the benefit of the present invention. This example is not intended to limit the claims herein.

EXAMPLE

During startup of a commercial reactor of design similar to that illustrated in present FIG. 1, a flow of 75 lbs/h of tetrachlorosilane was introduced through an inlet port into the area between the pressurizable shell and the reaction vessel. In comparison to the startup of similar reactors, methane generation was reduced by about 50 weight percent. The flow of tetrachlorosilane to the reactor was continued throughout the run resulting in reduced shell temperature and about a 5 percent increase in reactor efficiency as measured by total tetrachlorosilane conversion.

We claim:

1. In a process for hydrogenation of tetrachlorosilane, where the process comprises contacting hydrogen gas and tetrachlorosilane at a temperature greater than about 600° C. in a reactor comprising a pressurizable shell having located therein a reaction vessel forming a substantially closed inner chamber for contacting the hydrogen gas with the tetrachlorosilane, and an outer chamber between the pressurizable shell and the reaction vessel, the outer chamber having located therein and adjacent to the shell a carbon or graphite insulation layer and between the insulation layer and the reaction vessel one or more heating elements; the improvement comprising feeding to the outer chamber a gas or gaseous mixture having a chlorine to silicon molar ratio greater than about 3.5.

2. A process according to claim 1, wherein the gas fed to the outer chamber is tetrachlorosilane.

3. A process according to claim 1, where the gas is fed to the outer chamber at a rate sufficient to prevent leakage of hydrogen and tetrachlorosilane from the reaction vessel into the outer chamber.

4. A process according to claim 1, where the gas fed to the outer chamber is tetrachlorosilane or a mixture of tetrachlorosilane with one or more silanes selected from the group consisting of trichlorosilane, dichlorosilane, and chlorosilane.

5. A process according to claim 1, where the gaseous mixture fed to the other chamber comprises chlorine, hydrogen chloride, or a mixture thereof and one or more silanes selected from the group consisting of tetrachlorosilane, trichlorosilane, dichlorosilane, and chlorosilane.

6. In a process for hydrogenation of tetrachlorosilane, where the process comprises contacting hydrogen gas and tetrachlorosilane at a temperature greater than about 600° C. in a reactor comprising a pressurizable shell having located therein a reaction vessel forming a substantially closed inner chamber for contacting the hydrogen gas with the tetrachlorosilane, and an outer chamber between the pressurizable shell and the reaction vessel, the outer chamber having located therein and adjacent to the shell a carbon or graphite insulation layer and between the insulation layer and the reaction vessel one or more heating elements; the improvement comprising feeding to the outer chamber a gas comprising at least one selected from the group consisting of chlorine, hydrogen chloride.

7. A process according to claim 6, where the gas further comprises a mixture of said gas with a chlorosilane selected from a group consisting of tetrachlorosilane, trichlorosilane, dichlorosilane, and chlorosilane and the ratio of chlorine to silicon in said mixture is greater than about 3.5.

* * * * *